United States Patent

Matsumoto

[11] Patent Number: 5,980,285
[45] Date of Patent: Nov. 9, 1999

[54] ROTARY CONNECTOR APPARATUS

[75] Inventor: Tsuyoshi Matsumoto, Tokyo, Japan

[73] Assignee: Niles Parts Co., Ltd., Japan

[21] Appl. No.: 08/884,674

[22] Filed: Jun. 27, 1997

[30] Foreign Application Priority Data

Jun. 28, 1996 [JP] Japan ................................ 8-186923
Jun. 28, 1996 [JP] Japan ................................ 8-186924
Jun. 28, 1996 [JP] Japan ................................ 8-186925
Jun. 28, 1996 [JP] Japan ................................ 8-186927

[51] Int. Cl.$^6$ ........................................ H01R 3/00
[52] U.S. Cl. ........................ 439/164; 439/15; 439/736
[58] Field of Search ........................ 439/164, 15, 736, 439/689

[56] References Cited

U.S. PATENT DOCUMENTS

| | | | |
|---|---|---|---|
| 4,602,831 | 7/1986 | Lockard | 439/736 |
| 5,226,831 | 7/1993 | Horiuchi | 439/164 |
| 5,286,219 | 2/1994 | Euno et al. | 439/15 |
| 5,607,316 | 3/1997 | Ishikawa | 439/15 |
| 5,674,082 | 10/1997 | Okuhara et al. | 439/164 |

FOREIGN PATENT DOCUMENTS 4-54714  12/1992  Japan .

*Primary Examiner*—Kheim Nguyen
*Assistant Examiner*—T C Patel
*Attorney, Agent, or Firm*—Rader, Fishman & Grauer; Ronald P. Kananen

[57] ABSTRACT

A rotary connector apparatus for supplying electric power to an air bag mounted on a steering wheel has a stator housing, a rotor housing, a flexible cable within a space defined by the housings and a slidable sheet temporarily fixed by an engaging claw on the bottom housing until the stator housing is assembled. A bearing over the entire periphery of a lower end of the rotor housing includes a thrust bearing and a radial bearing. Crimp portions protruding from the rotor housing are inserted into a cord cover, and the cord cover is secured by crushing the crimp portions. The cord cover covers an outlet for the cord, and a holder for holding an end of the flexible cable is secured to the rotor housing. The holder has an arc-shaped surface on a side of a space accommodating the cable, and a tongue-shaped elastic piece is secured within a recess on the surface to prevent buckling of the cable.

10 Claims, 5 Drawing Sheets

ROTARY CONNECTOR APPARATUS

BACKGROUND OF THE INVENTION

This invention relates to a rotary connector apparatus for supplying electric power to an air bag or the like provided for example in a pad portion of a steering wheel of an automotive vehicle.

Recently, technology to prevent an automotive occupant from suffering collisional impacts by inflating an air bag during an automotive accident has been put to practical use. In the air bag, particularly an air bag provided in a pad portion of a steering wheel, it is necessary to supply electric power to an inflator of the air bag from the vehicular body side of the air bag through a rotary portion of the steering wheel. As a means for supplying electric power, there is one arrangement that principally uses a slip ring and another arrangement that employs a flexible, or soft, cable wound around in a spiral form like the rotary connector apparatus of this invention.

Conventionally, there have been proposed various types of rotary connector apparatuses of this kind. In a rotary connector apparatus disclosed for example by Japanese Utility Model Publication No. H4-54715, there are provided a stator housing, a rotor housing rotatably mounted on the stator housing, and a flexible cable accommodated in a spiral form within a space defined by both of the housings, wherein the rotary connector apparatus is further provided with a guide (peripheral wall) for guiding an end of the flexible cable to the inside of the space as well as an attachment (rotatable ring) for connecting the stator housing and the rotor housing.

The steering portion to which a rotary connector apparatus of this kind is attached is at a point adjacent to a driver's seat, and it is necessary to avoid causing abnormal sound from the rotary connector apparatus. However, in the conventional art stated above, the flexible cable is in direct contact with an inner wall of a housing so that there is a possibility of generating a sliding sound, for example, by the flexible cable. To this end, use of a slidable sheet excellent in slidability, wherein the slidable sheet is adhered to the inner wall of the housing, and a groove is provided at a boundary portion between the slidable sheet and the housing, has been contemplated so as to improve slidability of the flexible cable and thereby prevent generating a sliding sound.

However, where a slidable sheet is adhered to prevent the generation of a sliding sound as in the above conventional art, there are necessarily an adhesive agent and adhesive processes. Further, in order to secure by adhesion over a long term, there has been a concern that appropriate selection of materials for the housing or the adhesive agent is required. Also, there has been a possibility of tangling by a flexible cable falling into the groove at the boundary portion between the slidable sheet and the housing.

Since in the connector apparatus of the kind described above the rotor housing rotates relative to the stator housing, it is in general necessary to form a bearing structure at a contact point between the housings. However, the provision of the bearing increases, for example, the diameter of the axial portion of the rotor housing, which is accompanied by an increase in length of the flexible cable wound around the axial portion. Consequently, the cost required for the flexible cable rises, and the sliding sound generated due to contact by the flexible cable with the housing becomes great.

Each of the rotational connector apparatuses of the kind described above was provided with a cord electrically connecting the rotor housing and the stator housing to external apparatuses, which cord was connected with a holder for holding an end of a flexible cable within the housing, the connection point being covered by a cord cover. However, in the prior art techniques, the holder was mounted on a disk-shaped portion of the housing by securing the cord cover and the holder to each other by means of screws. This increased the size of the rotational connector apparatus in the axial direction.

Each of the rotational connector apparatuses of the kind described above was provided with a holder for holding an end of a flexible cable, and the flexible cable was connected with an external circuit. However, there was a risk that, where the shape of the holder was inappropriate, the holder caught on the flexible cable when the flexible cable was wound or unwound, which damaged the flexible cable. Further, there was also a problem that, when a tongue-shaped elastic piece for preventing buckling of the flexible cable was fixed, if a fixing portion of the tongue-shaped elastic piece protruded from the holder, the fixing portion interfered with the flexible cable.

SUMMARY OF THE INVENTION

The present invention solves the above-stated problems.

It is an object of the present invention to provide a structure for attaching a slidable sheet in a rotary connector apparatus which requires no adhesives where the slidable sheet is attached to a housing, and, besides having no grooves into which a flexible cable can fall, improves workability by temporarily fixing the slidable sheet to a stator housing during the assembling of the rotary connector apparatus.

The present invention provides a structure for attaching a slidable sheet in a rotary connector apparatus, in a rotary connector apparatus provided with a stator housing, a rotor housing rotatably attached to the stator housing, a flexible cable accommodated in a spiral form within a space defined by the housings, and a slidable sheet with which the flexible cable is in contact, characterized by the stator housing having an engaging claw and the slidable sheet being engaged at a side by the engaging claw. Therefore, no adhesives are required to attach the slidable sheet to the housing, and, there are no grooves into which the flexible cable can fall. In addition, workability is improved by the temporary fixing of the slidable sheet to the stator housing during assembly of the rotary connector apparatus. Also, the engaging claw is provided at an outer peripheral edge of the stator housing, so that the slidable sheet has excellent support.

It is another object to provide a bearing structure in a rotary connector apparatus which is capable of providing a bearing while keeping the diameter of an axial portion of the rotor housing short so that the length of the flexible cable that is wound around the axial portion can be short.

In order to achieve the above-stated object, the present invention provides a bearing structure in the rotary connector apparatus which extends over the entire periphery at an lower end of an axial portion of the rotor housing, forming a thrust bearing by slidably contacting the bearing portion with the receiving portion of the stator housing, and forming a radial bearing by slidably contacting the attachment with an inner peripheral surface of the stator housing. Therefore, a bearing can be provided while keeping the diameter of an axial portion of the rotor housing short so that the length of the flexible cable that is wound around the axial portion can be short. Accordingly, the flexible cable becomes inexpensive, and the sliding sound generated by the contact of the flexible cable with the housing is reduced. Also, the bearing portion is formed semi-circular in sectional shape so that the contact area of the bearing portion with the retaining portion is reduced, decreasing the sliding resistance therebetween.

Yet another object is to provide a cord cover by which it is possible to decrease the size of the rotational connector apparatus in the axial direction.

In order to achieve the above object, the present invention is characterized in that at least one of the two housings covers a leading-out position for the cord and that the apparatus further comprises a cord cover for securing a holder holding an end of the flexible cable to a shaft portion of at least one of the two housings. The cord cover is secured by inserting crimp portions protruding from an outer surface of the at least one of two housings into the cord cover and by crushing the crimp portions. Further, since crimp portions protruding from the outer surface of at least one of two housings are inserted into the cord cover and the cord cover is secured by crushing the crimp portions, it is possible not only to decrease the size of the rotational connector apparatus in the axial direction but also to lower fabrication cost, because the cord cover can be secured surely and no screws are required.

A further object is to provide a flexible cable holder construction in which the holder and the tongue-shaped piece do not damage the flexible cable.

In order to achieve the above object, the invention provides a flexible cable holder construction characterized in that a surface of the holder on a side of a space where the flexible cable is accommodated is arc-shaped. As a result of this construction, the holder does not catch on the flexible cable, which would damage the flexible cable, and the flexible cable is wound smoothly. Further, since the holder has a recess portion on the arc-shaped surface and a tongue-shaped elastic piece is fixed within the recess portion for preventing buckling of the flexible cable, the tongue-shaped elastic piece does not interfere with the flexible cable.

BRIEF DESCRIPTION OF THE DRAWINGS

FIG. 1(*b*) is a perspective of the embodiment of FIG. 1(*a*);

FIG. 3(*b*) is a perspective view showing the main portion of the bottom housing of FIG. 2 in a condition in which a second side of a sliding sheet is inserted into a guiding portion;

FIG. 4(*b*) is a plan view of a stator housing as viewed from a space for accommodating a flexible cable;

DETAILED DESCRIPTION OF THE PREFERRED EMBODIMENT

Figure 1A:
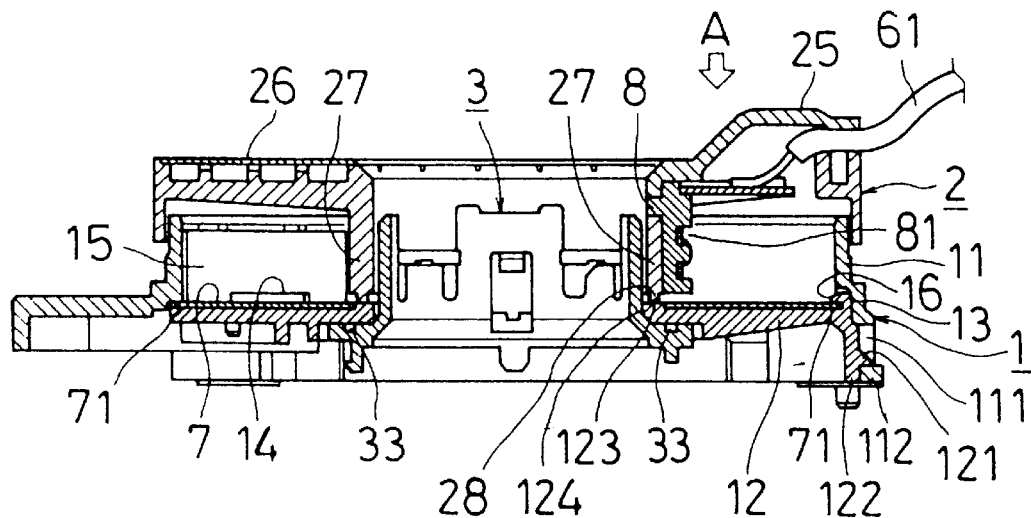
FIG. 1(*a*) is a sectional view of a first embodiment of the present invention.

The attached drawings show an embodiment according to the present invention. In the figures, 1 is a stator housing, 2 is a rotor housing, 3 is an attachment, 4 is a flexible cable, 5 and 6 are terminals, and 7 is a slidable sheet, which will be explained in the following.

First, the stator housing 1 is a portion that is fixed, for example, to a combination switch (not shown) for an automotive vehicle. The stator housing 1 is structured by combining a side housing 11 and a bottom housing 12. Specifically, the side housing 11 and the bottom housing 12 respectively have a fitting port 111 and a fitting claw 121, and the side housing 11 and the bottom housing 12 are coupled by fitting the fitting claw 121 in the fitting port 111. Incidentally, the side housing 11 and the bottom housing 12 may be formed in one piece to constitute the stator housing 1.

Figure 1B:
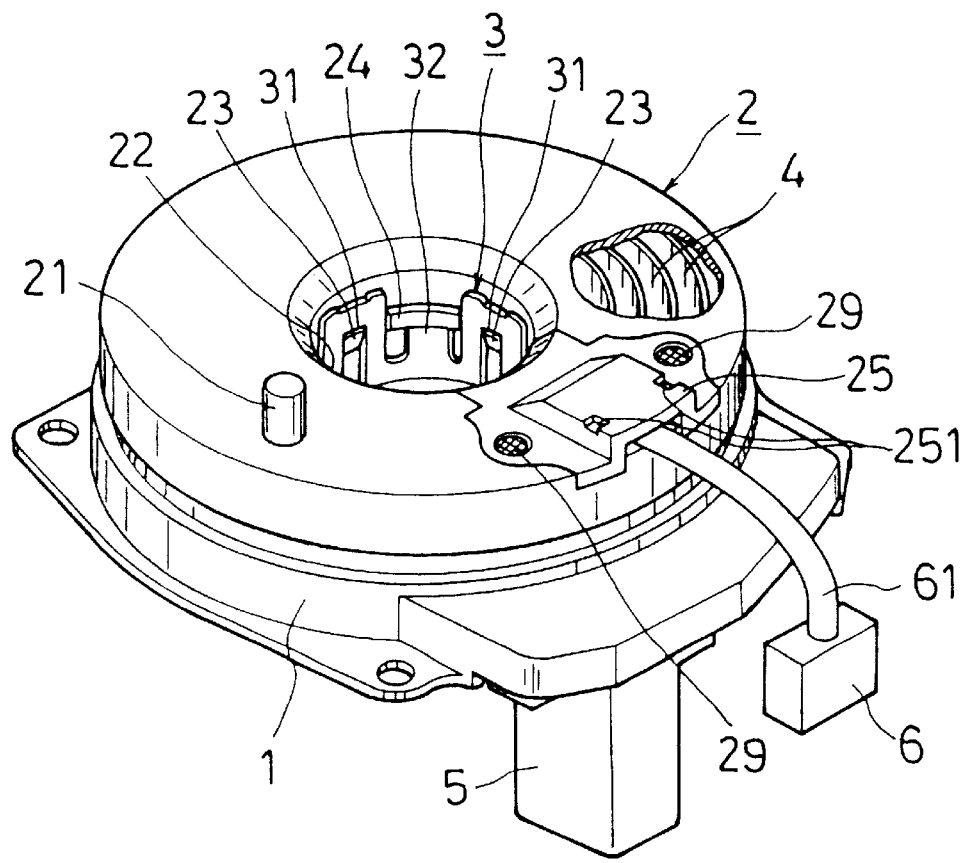
Figure 2:
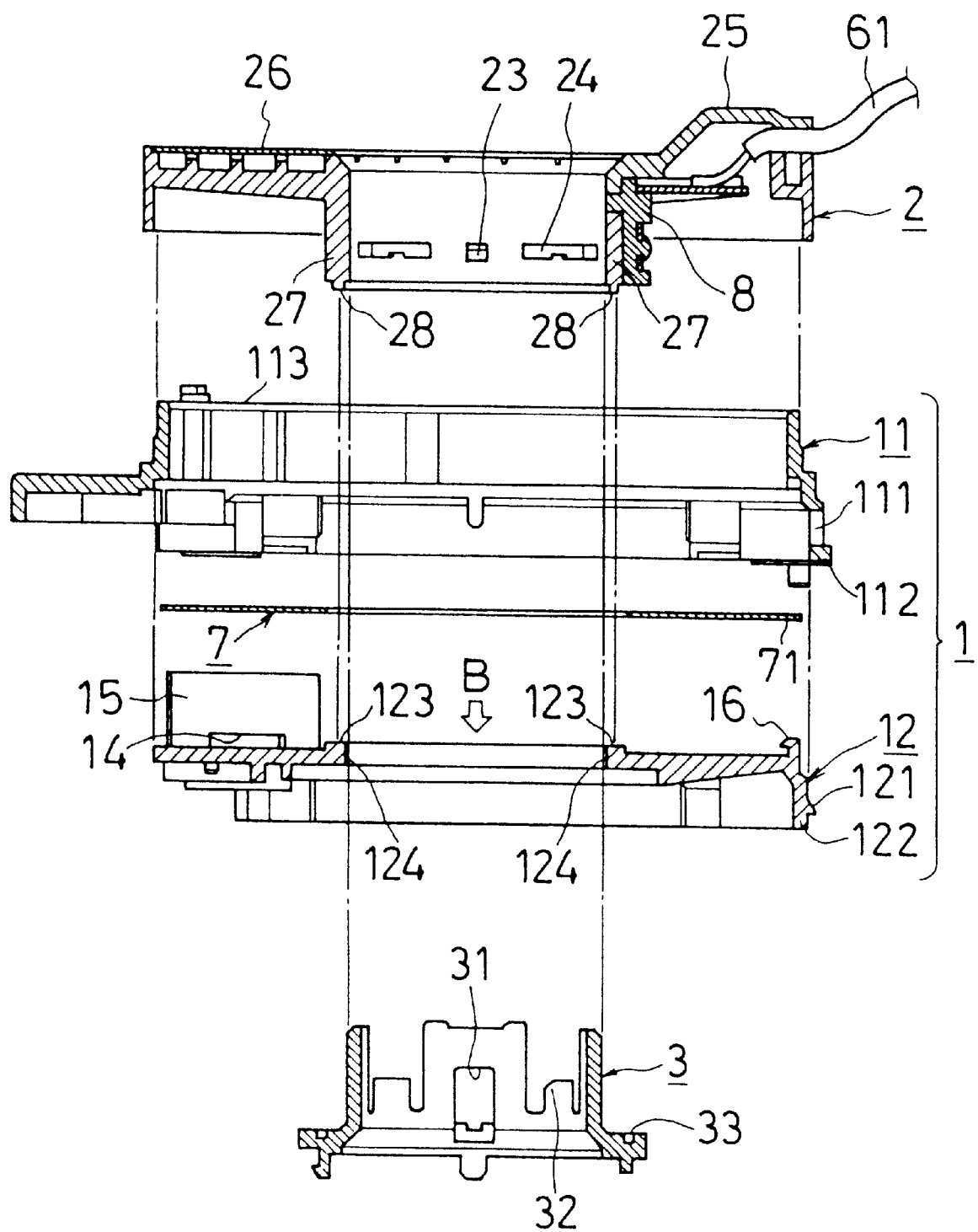
FIG. 2 is an exploded view of the apparatus of FIG. 1(*a*)
Figure 3A:
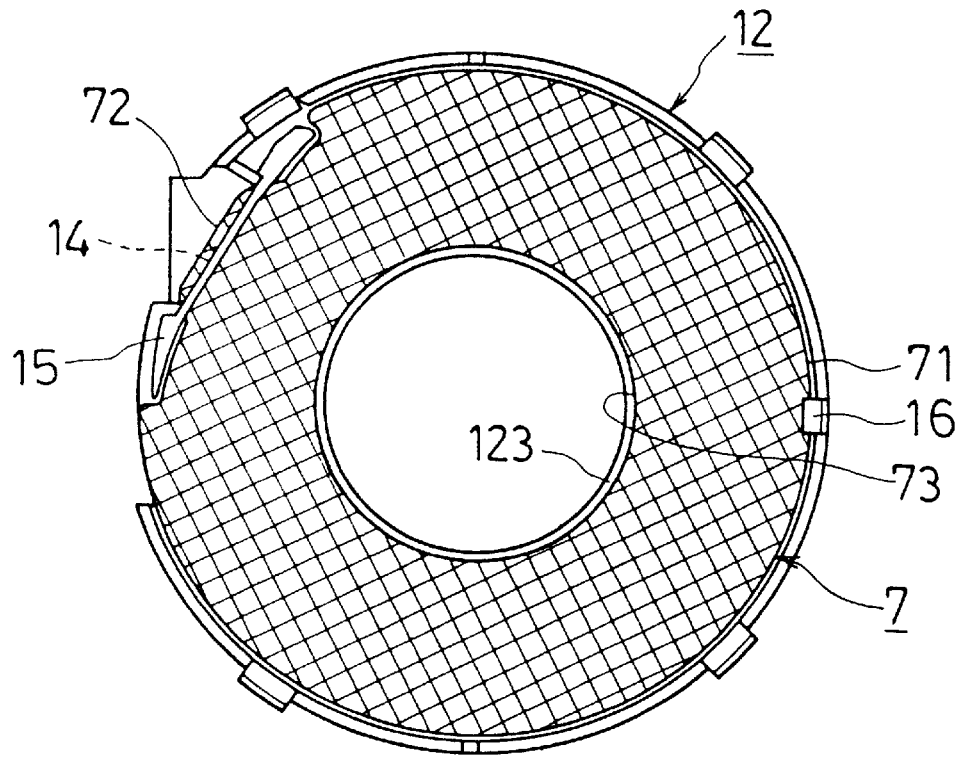
FIG. 3(*a*) is a plan view of a bottom housing of the apparatus of FIG. 2 as viewed in the direction of the arrow B in FIG. 2.
Figure 3B:
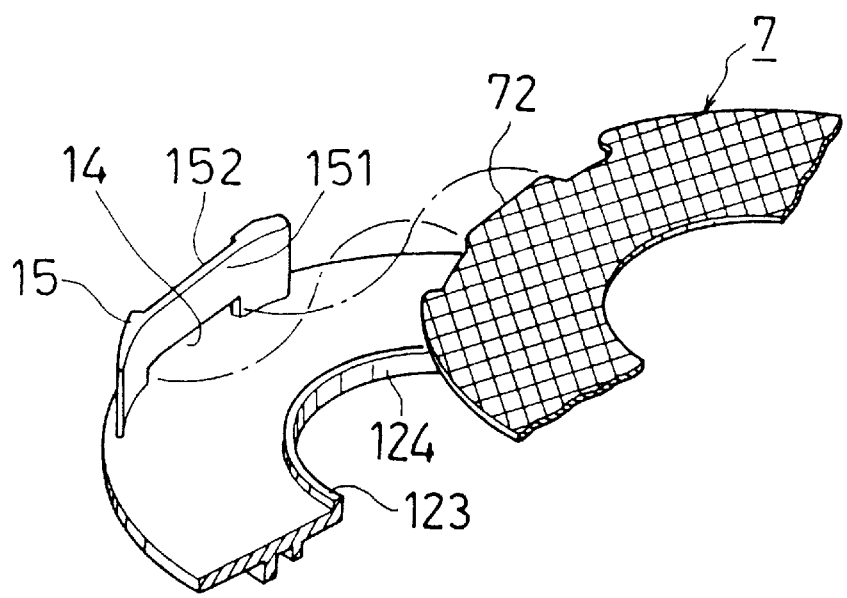

The side housing 11 and the bottom housing 12 are sized such that their respective base ends 112, 122 are flush with each other, and when the stator housing 1 is fixed to a combination switch, both the respective base ends 112, 122 contact the combination switch. To this end, even if an external force is applied to the bottom housing 12, for example, in a direction shown by the arrow A in FIG. 1(*a*), the bottom housing 12 at its base end 122 abuts the combination switch to be prevented from being deformed in the arrow A direction, and the fitting claw 121 of the bottom housing 12 is prevented from moving out of the fitting port 111 of the side housing 11.

The stator housing 1 has a first gap 13 radially extending at a portion where the side housing 11 and the bottom housing 12 are joined, so that a first side 71 of the slidable sheet 7 can be inserted into the first gap 13.

The bottom housing 12 has a guide 15 for supporting an end of the flexible cable 4 and guiding the flexible cable 4 into a space defined by the housings 1 and 2. The guide 15 has a first surface 151 on a side of the space accommodating the flexible cable 4 in a spiral form and a second surface 152 as a back face with respect to the first surface 151, and a second gap 14 is provided to penetrate between the first surface 151 and the second surface 152. In addition, a second side 72 of the slidable sheet 7 is inserted into the second gap 14. Furthermore, the bottom housing 12 is integrally formed with an engaging claw 16 at a peripheral edge on the opposite side to the guide 15 so that the slidable sheet 7 is temporarily fixed to the bottom housing 12 by the engaging claw 16 until the bottom housing 12 and the side housing 11 are combined to complete the stator housing 1.

Then, the rotor housing 2 is rotatably mounted on the stator housing 1 and is coupled to a steering wheel (not shown) by a coupling pin 21. The rotor housing 2 has an inner periphery 22 with a claw 23 to be fitted to a fitting portion 31 provided in the attachment 3 and a step portion 24 to be abutted against a protuberance 32 provided in the attachment 3.

Figure 6:
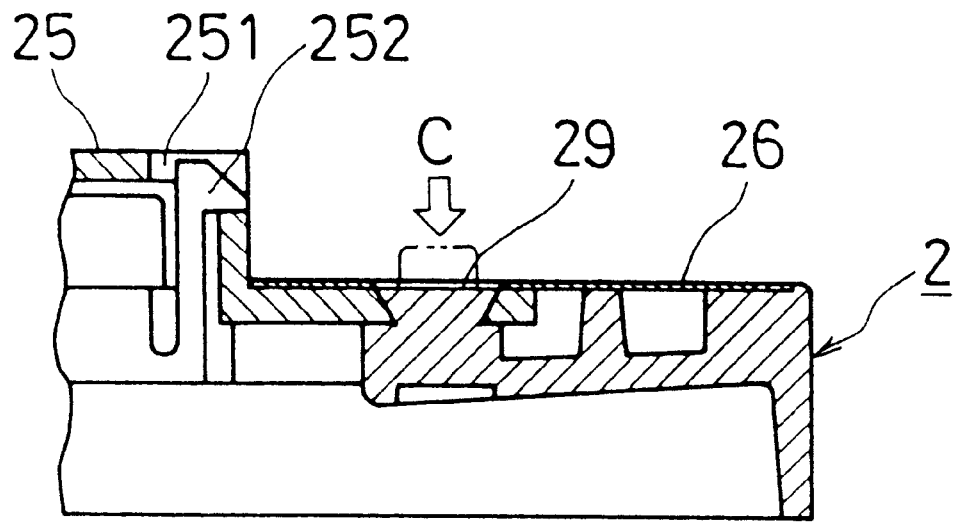
FIG. 6 is an enlarged fragmentary view sectional view of a peripheral portion of the cord cover of FIG. 1(*a*)

The rotor housing 2 has a cord cover 25 for covering an exposed portion of a cord 61 of the terminal 6 and for fixing a support member 8, described later, to an axial portion 27 of the rotor housing 2. The cord cover 25 is attached to crimp portions 29 projecting from the upper surface of the rotor housing 2 and into the cord corer, and the crimp portions are deformed by applying heat or ultrasonic waves in a direction of the arrow C shown in FIG. 6. Thereafter, a caution label 26 describing cautions concerning handling of the rotary connector apparatus is adhered to the rotor housing 2. The cord cover 25 has a pair of holes 251 so that, by elastically fitting the claws 252 of the rotor housing 2 in the holes 251, the cord cover 25 can be temporarily held by the rotor housing 2 until the crimp portion 29 is deformed.

Figure 4A:
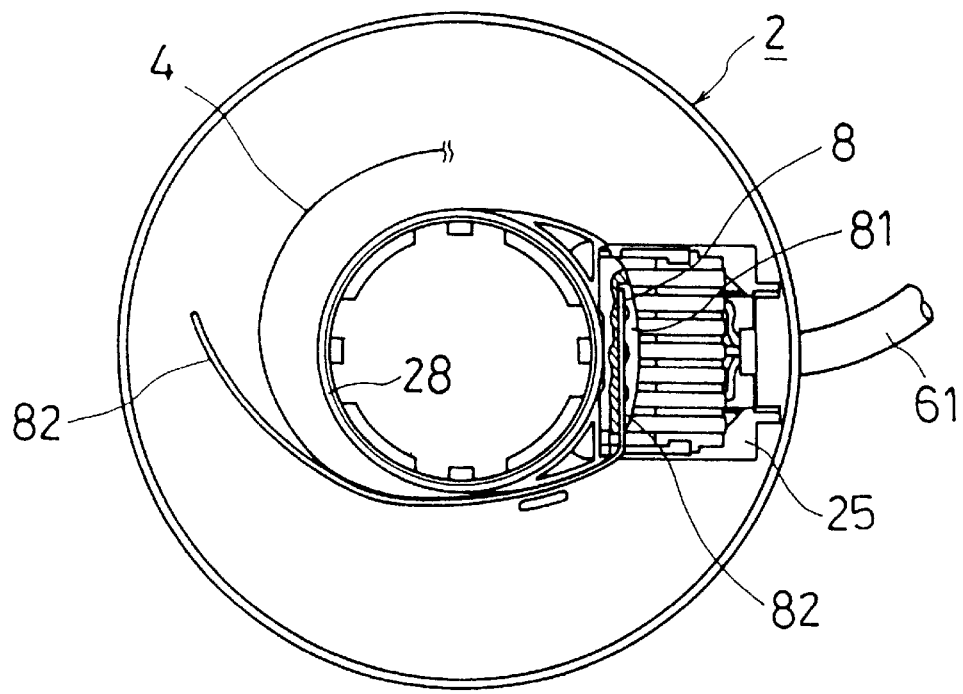
FIG. 4(*a*) is a plan view of a rotor housing as viewed from a space for accommodating a flexible cable.
Figure 4B:
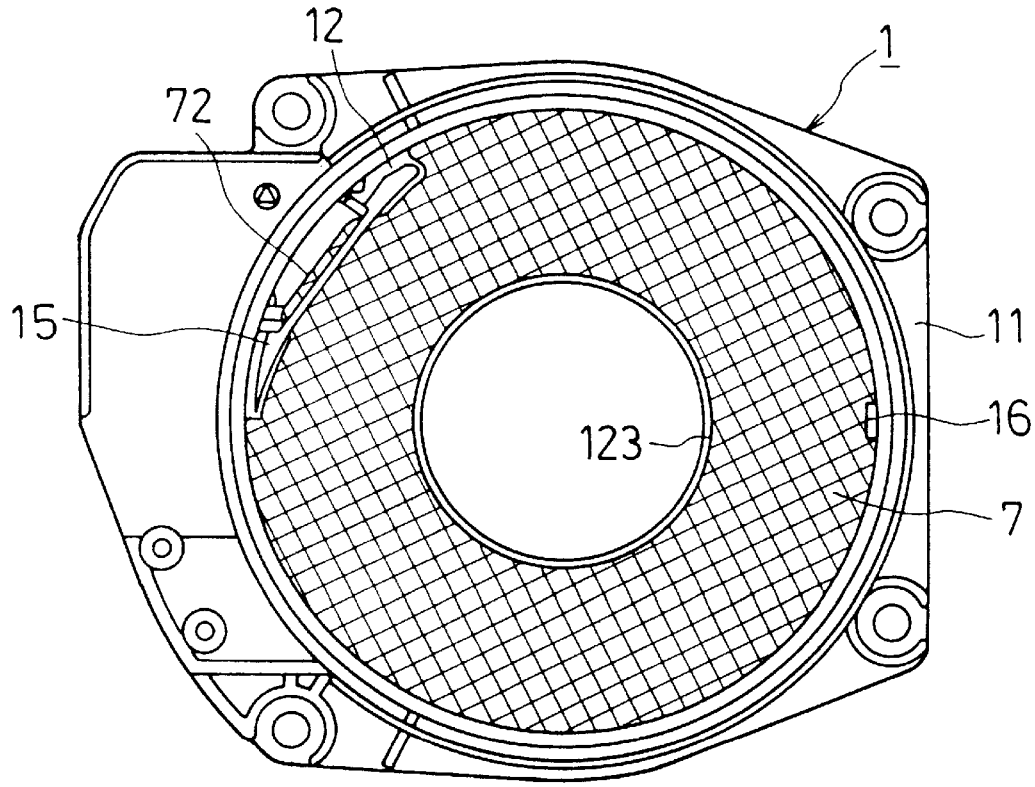
Figure 5:
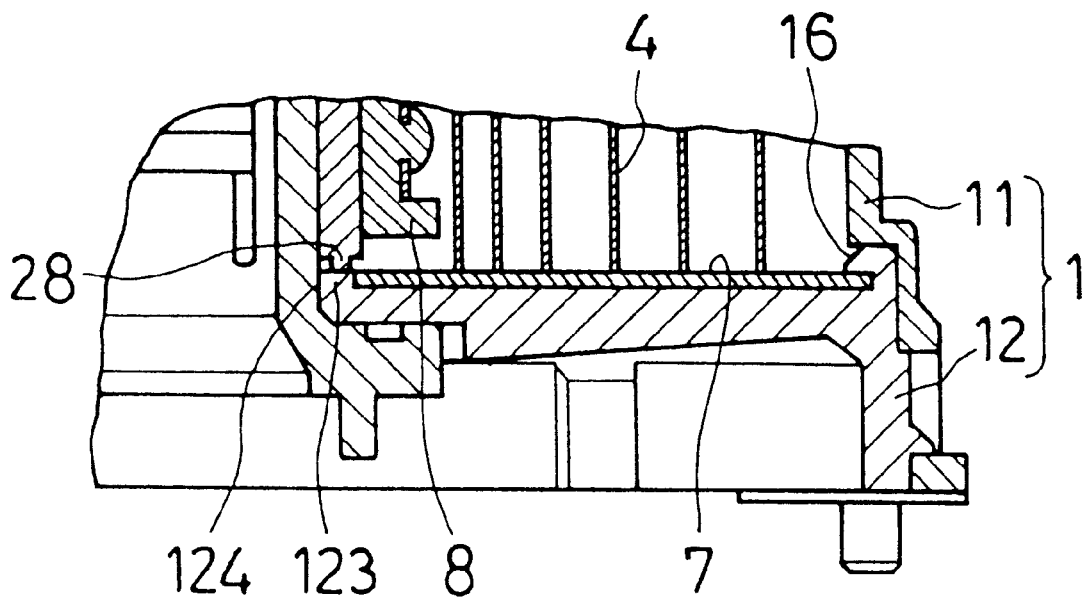
FIG. 5 is an enlarge fragmentary view of a peripheral portion of the bottom housing of FIG. 1(*a*)

The axial portion 27 is provided at its lower end with a bearing portion 28 having in section a semicircular form extending over the entire periphery thereof so that the bearing portion 28 rests in slidable contact on a retaining portion 123 of the housing 12 adjacent to an inner peripheral surface 124 of the housing, forming a (axial) thrust bearing. Also, the support member 8 is a component for supporting one end of the flexible cable 4. The support member 8 is in an arcuate form on a side facing the accommodating space for the flexible cable 4, as shown in FIG. 4 (a), wherein a recess 81 is provided in an arcuate surface to fix there inside a resilient tongue 82 for preventing buckling in the flexible cable 4, and avoiding breakage or damage of the flexible cable 4 by the support member 8.

The attachment 3 serves to connect the housings 1 and 2 to one another, and has a fitting portion 31 to be resiliently fitted with a claw 23 of the rotor housing 2 and a protuberance 32 to be abutted against a step portion 24 of the rotor housing 2. Furthermore, the attachment 3 has a grease reservoir 33 formed as a groove over the entire periphery of a surface adjacent to the bottom housing 12 in the stator housing 1. By filling the grease reservoir 33 with grease, rotary resistance between the attachment 3 and the bottom housing 12 is reduced. The attachment 3 also is in slidable contact with an inner peripheral surface 124 of the bottom housing 12, forming a radial (radial direction) bearing.

The flexible cable 4 is a so-called flat cable of a structure having, for example, a conductor wire sandwiched by resin films. The flexible cable 4 is accommodated within a doughnut-shaped space defined by the stator housing 1 and the rotor housing 2, one end of the flexible cable being electrically connected to the terminal 5 of the stator housing 1 and the other end to the terminal 6 of the rotor housing 2.

The slidable sheet 7 is a sheet for reducing sliding resistance in the flexible cable 4 to avoid generation of abnormal sound when the flexible cable 4 slides within the doughnut-shaped space defined by the housings 1 and 2, the sheet being formed of a tetraethylene fluoride resin (PTFE) or the like with excellent slidability into the general shape of a doughnut. The slidable sheet 7 has a first side 71 defining, for example, 80% or more of an outer periphery of the slidable sheet, a second side 72 defining the remainder of the outer periphery, and a third side 73 defining an inner periphery of the slidable sheet. The first side 71 and the third side 73 have an arcuate form, and the second side 72 is in a concave-convex form suitable for being inserted into the second gap 14 provided in the guide 15.

The rotary connector apparatus structured as above operates as follows. The rotary connector apparatus is connected at the terminal 6 to, for example, an air bag device (not shown) on a steering wheel side of the apparatus and at the other terminal 5 to, for example, an air bag controller (not shown) on a vehicular body side of the apparatus. In this way, when the automotive vehicle becomes involved, for example, in a collision, an electric signal from the air bag controller is transmitted to, for example, an air bag device in the steering pad via the flexible cable of the rotary connector apparatus, resulting in ignition of the inflator and resultant expansion of the air bag.

It will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by the appended claims.

I claim:

1. A rotary connector apparatus, comprising:

a stator housing comprising a side housing portion, a bottom housing portion, and a structure for coupling the side housing portion and the bottom housing portion together;

a rotor housing rotatably attached to the stator housing;

a flexible cable accommodated in a spiral form within a space defined by the housings; and a slidable sheet with which the flexible cable is in contact;

wherein said bottom housing portion of the stator housing has an engaging claw extending therefrom, and the slidable sheet is engaged at a side by the engaging claw to temporarily fix the slidable sheet to the bottom housing portion until the bottom housing portion and the side housing portion are coupled together.

2. A rotary connector apparatus as recited in claim 1, wherein the engaging claw is positioned at an outer peripheral edge of the bottom housing portion of the stator housing.

3. A rotary connector apparatus, comprising:

a stator housing;

a rotor housing rotatably attached to the stator housing;

an attachment for coupling the housings to one another;

a flexible cable accommodated in a spiral form within a space defined by the housings;

a bearing portion extending over an entire periphery at a lowermost end of an axial portion of the rotor housing;

a thrust bearing defined by the bearing portion slidably contacting the receiving portion of the stator housing; and a radial bearing defined by the attachment slidably contacting a peripheral surface of the stator housing facing radially inwardly.

4. A rotary connector apparatus as recited in claim 3, wherein the bearing portion is semi-circular in sectional shape.

5. A rotary connector apparatus, comprising:

a stator housing;

a rotor housing mounted rotatably on said stator housing; and a flexible cable accommodated in a spiral form in a space formed by said housings; and a cord cover for covering an exposed portion of a cord passing through an upper surface of the rotor housing and for securing a holder holding an end of said flexible cable to a cylindrical shaft portion of said rotor housing, said cord cover being secured to said rotor housing by a temporary holding structure comprising a pair of claws elastically fitted into a pair of holes, respectively, and by a permanent holding structure comprising deformable portions protruding from an outer surface of said rotor housing into said cord cover, said deformable portions each having a permanently deformed portion that engages and secures the cord cover to said rotor housing.

6. A rotary connector apparatus, comprising:

a stator housing;

a rotor housing mounted rotatably on said stator housing;

a flexible cable accommodated in a spiral form in a space formed by said housings; and a holder secured to a shaft portion of said rotor housing for holding an end of said flexible cable;

wherein a surface of said holder on a side facing radially outwardly within a space where said flexible cable is accommodated is arc-shaped, said holder has a recess portion on said arc-shaped surface, and a tongue-shaped elastic piece is fixed to said holder within said recess portion for preventing buckling of said flexible cable.

7. A rotary connector apparatus for supplying electric power to an air bag mounted on a steering wheel, comprising:

a stator housing comprising a side housing portion, a bottom housing portion, and a structure for coupling the side housing portion and the bottom housing portion together;

a rotor housing rotatably attached to the stator housing;

means for coupling the housings to one another;

a flexible cable accommodated in a spiral form within a space defined by the housings;

a slidable sheet contacting the flexible cable; and an engaging claw extending from said bottom housing portion of said stator housing, said engaging claw engaging a side of the slidable sheet to temporarily fix the slidable sheet to the bottom housing portion until the bottom housing portion and the side housing portion are coupled together.

8. The rotary connector apparatus of claim 7, further comprising:

a bearing portion on an entire periphery of a lower end of an axial portion of the rotor housing;

a thrust bearing defined by said bearing portion and a receiving portion of the stator housing in contact with said bearing portion; and a radial bearing;

wherein said means for coupling the housings comprises an attachment, and said radial bearing is defined by said attachment slidably contacting a peripheral surface of the stator housing facing radially inwardly.

9. The rotary connector apparatus of claim 7, further comprising:

a holder holding an end of said flexible cable; and a cord cover for covering an exposed portion of a cord passing through an upper surface of the rotor housing and for securing the holder to a cylindrical shaft portion of said rotor housing, said cord cover being secured to said rotor housing by a temporary holding structure comprising a pair of claws elastically fitted into a pair of holes, respectively, and by a permanent holding structure comprising deformable portions protruding from an outer surface of said rotor housing into said cord cover, said deformable portions each having a permanently deformed portion that engages and secures the cord cover to said rotor housing.

10. The rotor connector apparatus of claim 7, further comprising:

a holder holding an end of said flexible cable, wherein said holder is secured to a shaft portion of said rotor housing, and a surface of said holder on a side facing radially outwardly within a space where said flexible cable is accommodated is arc-shaped, said holder has a recess portion on said arc-shaped surface, and a tongue-shaped elastic piece is fixed to said holder within said recess portion for preventing buckling of said flexible cable.

* * * * *